(12) United States Patent
Fremy

(10) Patent No.: US 6,598,620 B1
(45) Date of Patent: Jul. 29, 2003

(54) FAUCET AND PIPE CONNECTION INCLUDING A SPHERICAL VALVE ELEMENT

(76) Inventor: Raoul Fremy, 4, route de Machault 77878, Vulaines sur Seine (FR)

( * ) Notice: Subject to any disclaimer, the term of this patent is extended or adjusted under 35 U.S.C. 154(b) by 0 days.

(21) Appl. No.: 10/009,821

(22) PCT Filed: Jun. 13, 2000

(86) PCT No.: PCT/FR00/01627

§ 371 (c)(1),
(2), (4) Date: Apr. 2, 2002

(87) PCT Pub. No.: WO00/77438

PCT Pub. Date: Dec. 21, 2000

(30) Foreign Application Priority Data

Jun. 14, 1999 (FR) .............................. 99 07504

(51) Int. Cl.[7] .............................. F16L 29/00
(52) U.S. Cl. .............................. 137/614.03; 251/149.2
(58) Field of Search ........................ 137/614.03, 614.01, 137/614.02, 614.05; 251/149.2

(56) References Cited

U.S. PATENT DOCUMENTS

| 3,078,068 A | 2/1963 | Romney |
| 4,181,149 A | * 1/1980 | Cox .................. 137/614.03 X |
| 4,473,211 A | 9/1984 | Fremy |
| 4,664,149 A | * 5/1987 | Fremy .............. 137/614.01 X |
| 5,090,448 A | * 2/1992 | Truchet ................ 137/614.03 |

FOREIGN PATENT DOCUMENTS

| EP | 0 202 798 | 11/1986 |
| EP | 0 441 727 | 8/1991 |

* cited by examiner

*Primary Examiner*—Kevin Lee
(74) *Attorney, Agent, or Firm*—Young & Thompson

(57) ABSTRACT

A faucet for pipe connection designed to be incorporated in a receiving structure such as a pipe or tank, includes a cylindrical body inside which is housed in concentric manner a sleeve defining the fluid communication channel and bearing at its outer end, articulated in rotation, a spherical closure element having a diametrical bore, a cylindrical ring, enclosing the sleeve and the spherical closure element, being housed so as to be capable of being driven in translation in the cylindrical body countering the effect of elastic return elements, the strokes in translation of the ring in the body driving in rotation the spherical closure element between an opening position wherein its bore is brought to coincide with the fluid communication channel and its closing position. The sleeve and the cylindrical ring of the faucet are mounted oscillating in the body of the faucet.

15 Claims, 7 Drawing Sheets

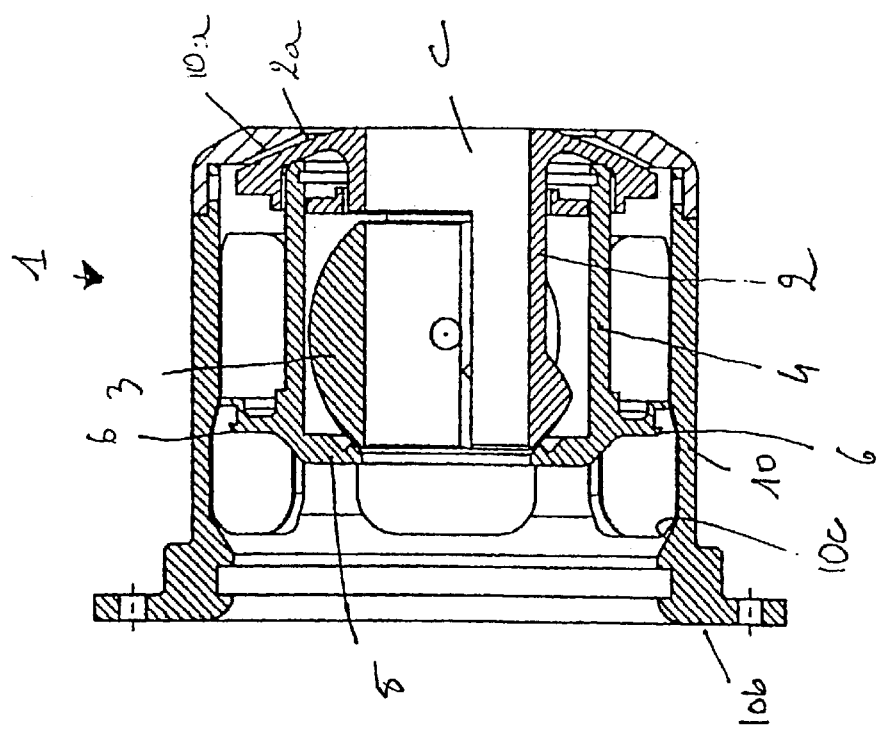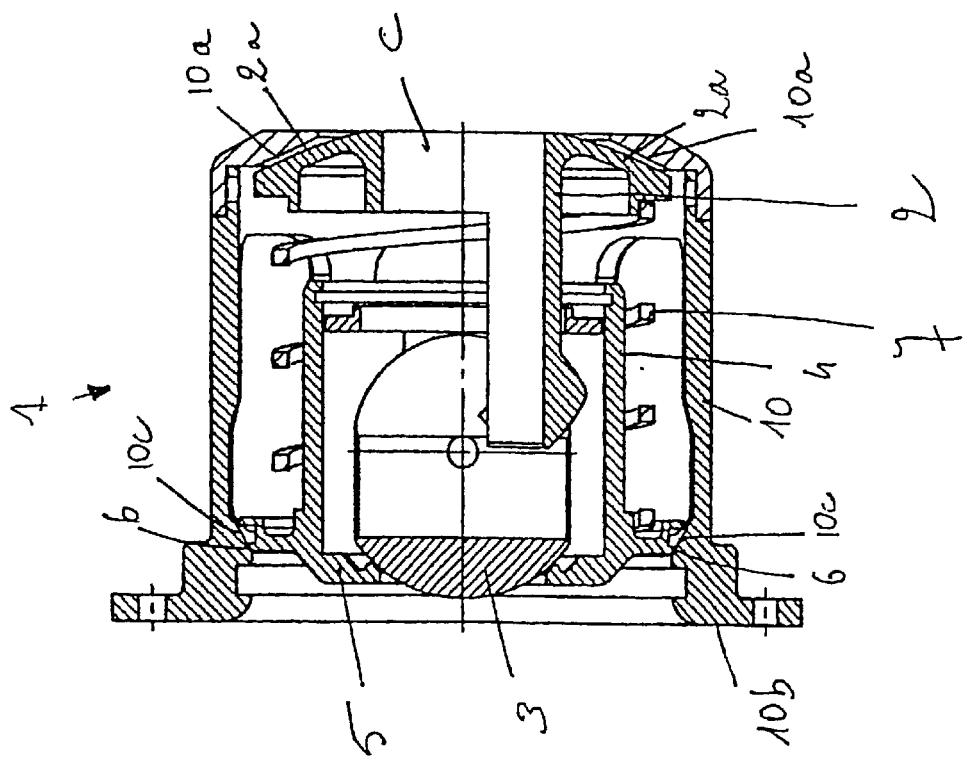

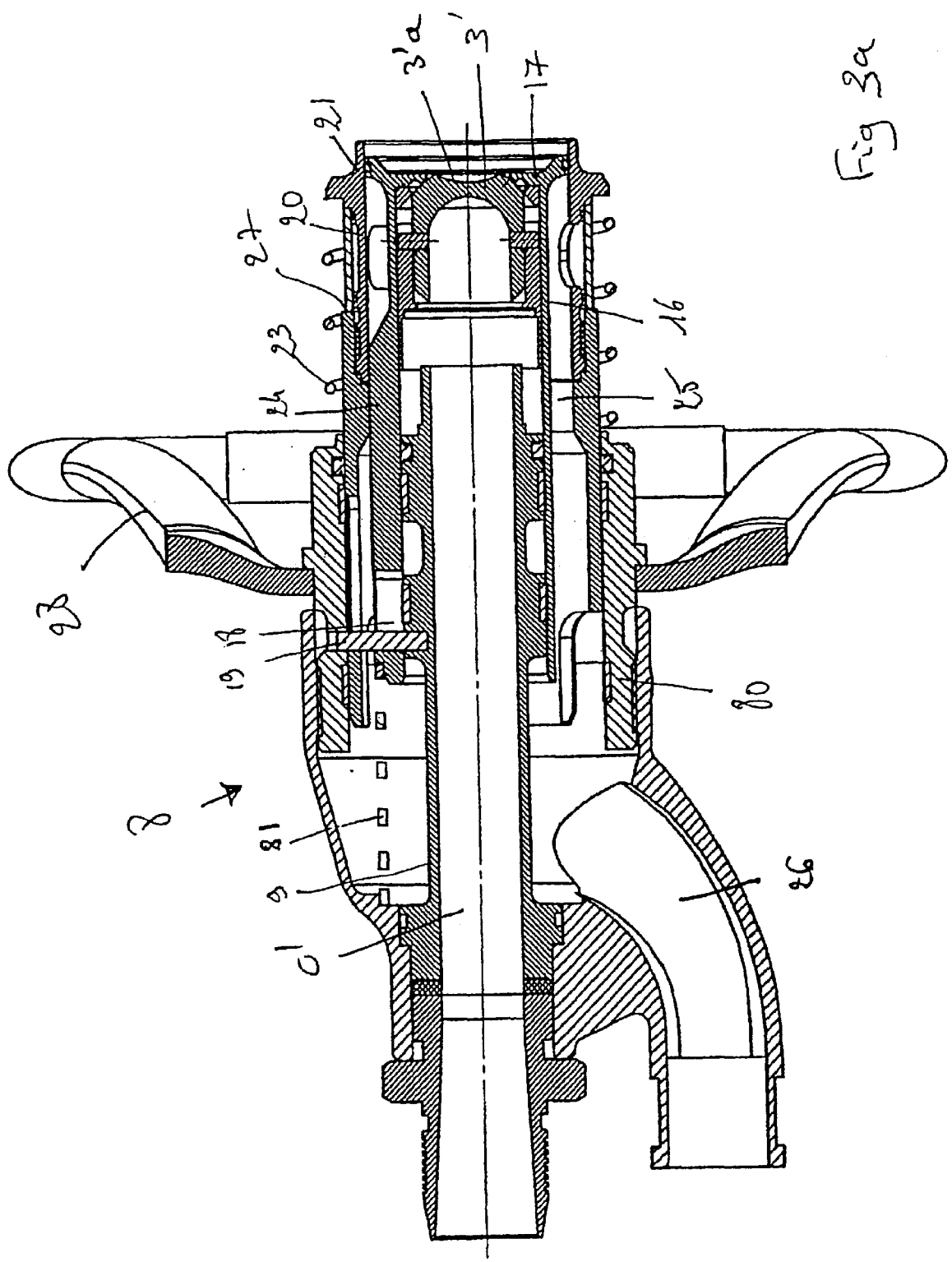

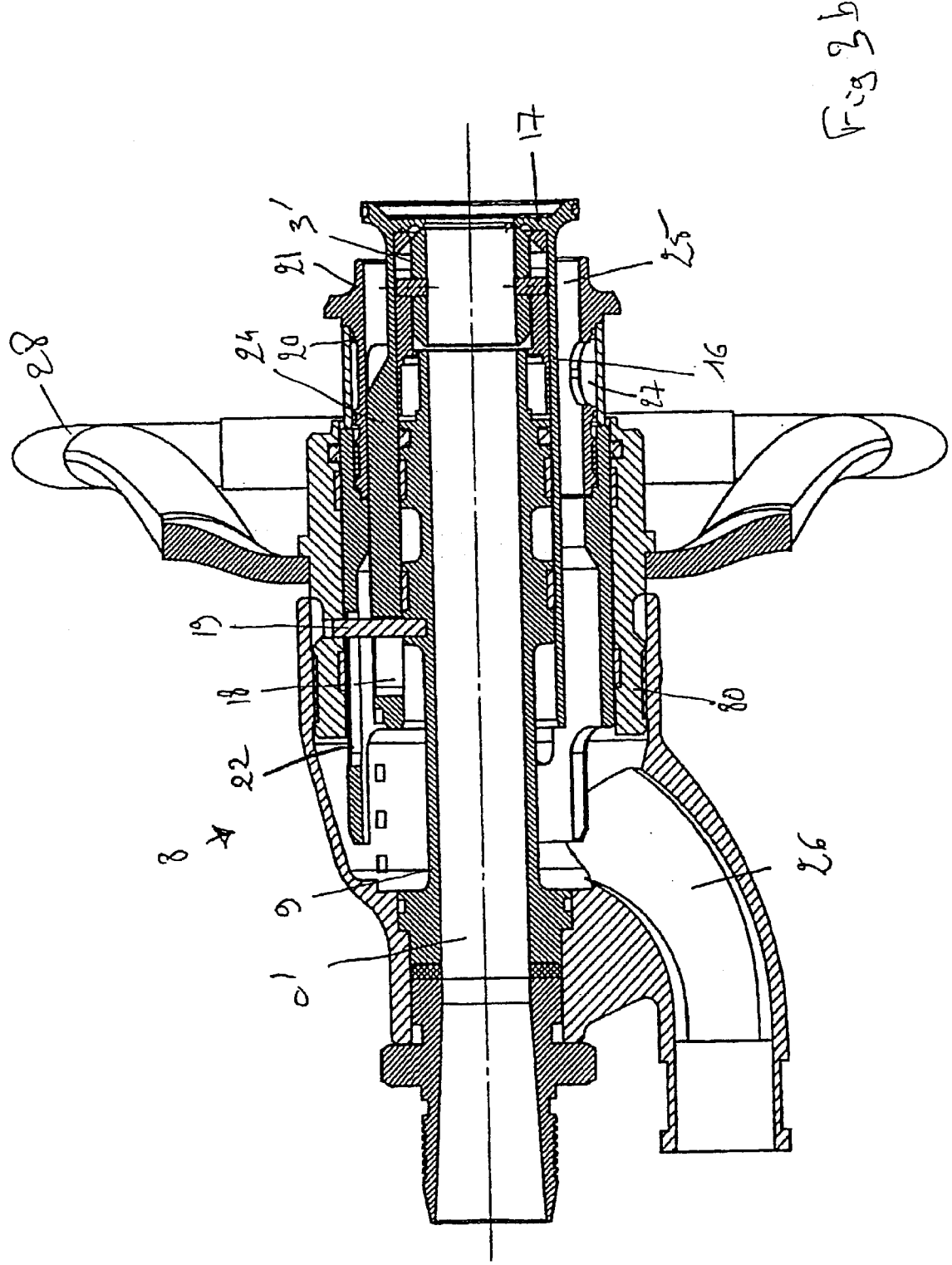

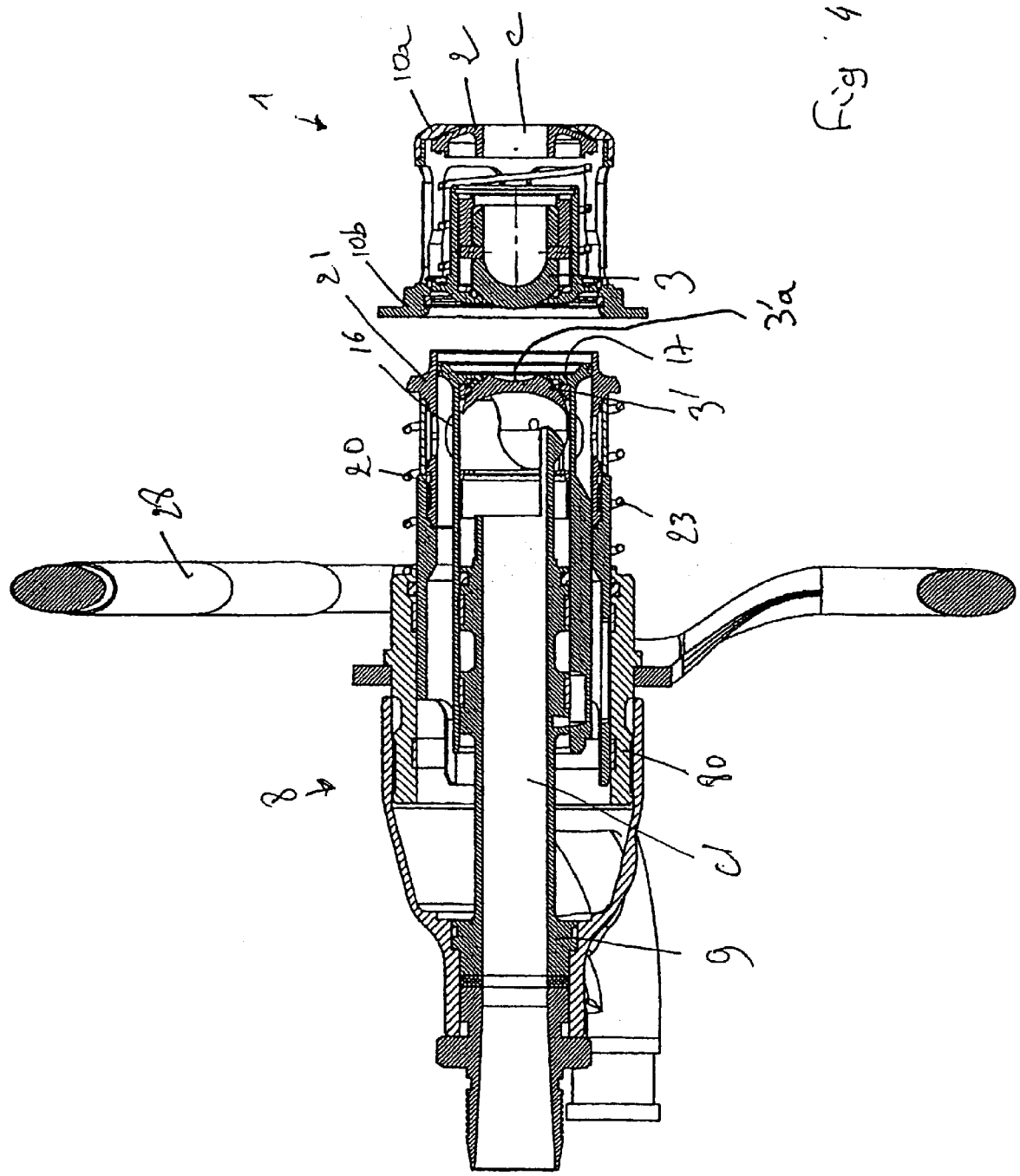

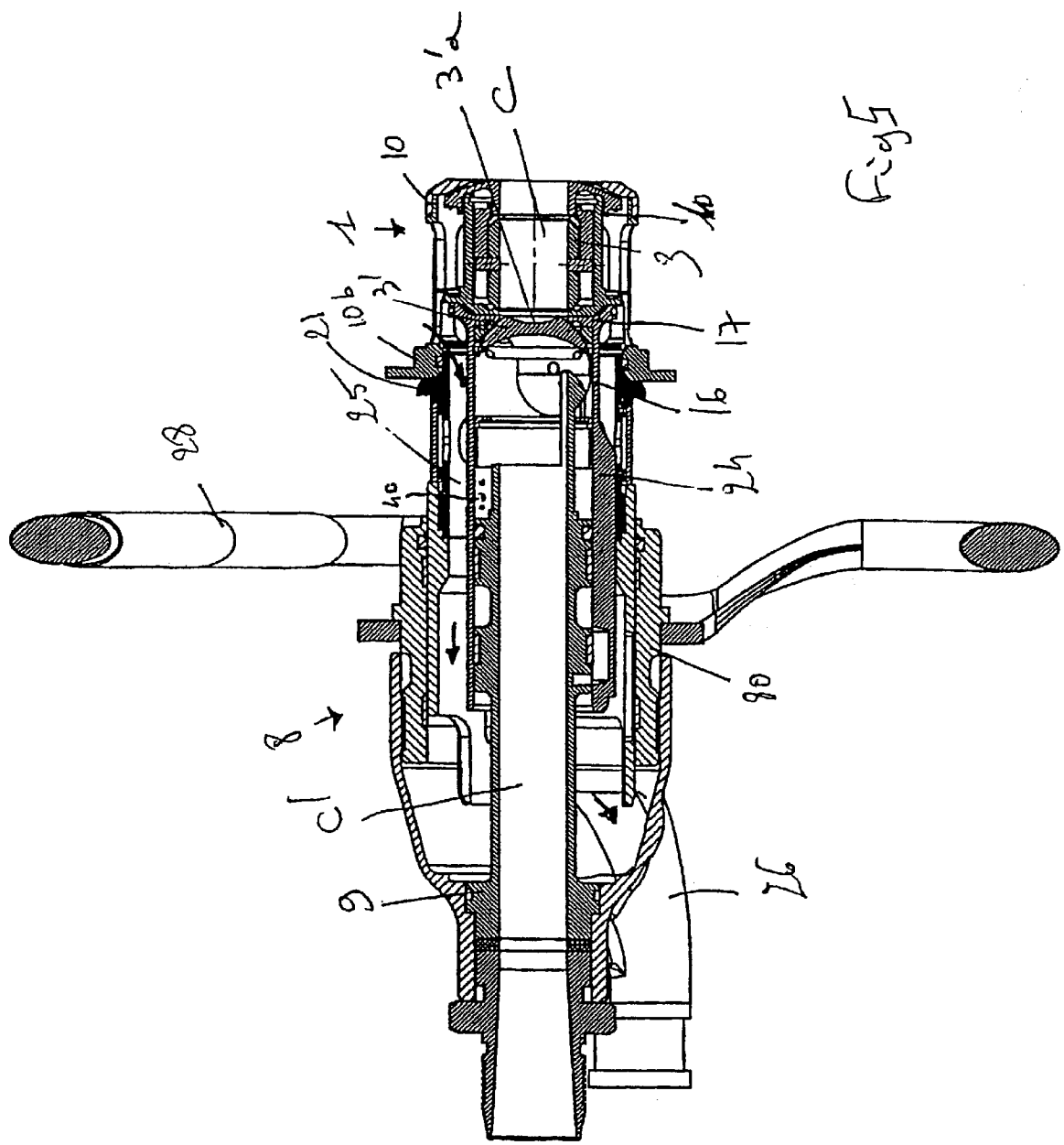

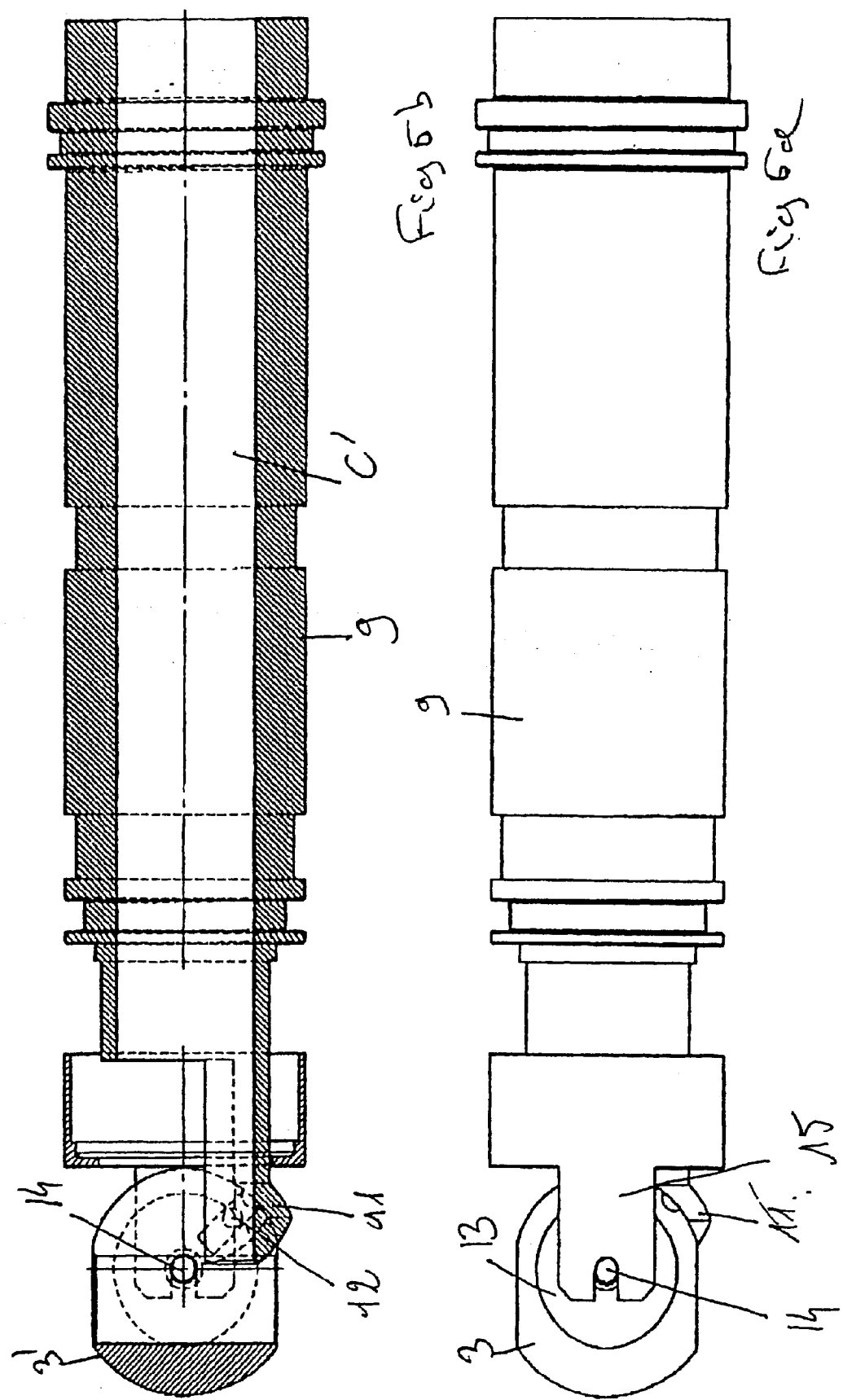

FAUCET AND PIPE CONNECTION INCLUDING A SPHERICAL VALVE ELEMENT

BACKGROUND OF THE INVENTION

The present invention relates to a female fitting and the pipe connection in which a male fitting is engaged in said female fitting, the engagement ensuring the opening of a valve provided on at least one of these elements, the valve being of the rotating ball type.

A valve of this type has a closure element of generally spherical shape, made as a horseshoe and comprising millings or piercings so as to position the closure element. This spherical closure element is mounted in a connecting element or male fitting or female fitting with its center coinciding with the axis of the channel for passage of the fluid to be controlled, this spherical closure element, which bears against a seat at the outlet of the channel in the valve chamber comprising a diametrical bore, which can by suitable means be brought into coincidence with the channel for the fluid to ensure opening of the valve or to be oriented substantially 90° to ensure closing of the valve.

A spherical closure element of this type comprises a rotation means such as two balls or a transverse shaft which is arranged to coact with a sleeve having the shape of a hollow shaft and which directs the fluid stream, the sleeve being prolonged at one end by a member such as an arm or a rod which is articulated on the rotation member. A fitting also comprises a cylindrical ring defining at its external end a bearing seat and the sealing in the cylindrical body and against which comes to bear the spherical closure member drivable in translation in the fitting according to the paths determining the conditions of opening and closing of the closure element, the assembly of these elements being enclosed in a concentric cylindrical body.

Such a connection is known from FR 2.521.685 in which the valve comprises a fixed axial sleeve disposed at the rear of the body of the fitting, directed toward the outlet of the connection and traversed by the passage of the connection, this sleeve comprising at its inner end corresponding to the rear of the body, a support for a return spring and at its external end, on the side of the connection region, a radial flange whose two lateral surfaces are tangent to the external surface of the sleeve, a chamber opening into the sector in the spherical region opposite to the active sector being provided in the spherical closure element, this chamber comprising surfaces cooperating in sliding contact with the side surfaces of the flange of the sleeve and the axle for driving in rotation the closure element being carried by the flange of the sleeve and perpendicular to said surfaces.

This type of pipe connection is used in hydraulic fields, in armament and in the field of space. In particular, it is used as a pipe connection for the fueling of vehicles. In the case of racing vehicles or military vehicles, it is desirable that the refueling take place as rapidly as possible and in a sure manner thereby guaranteeing perfect security of the connection.

Thus, in the case of use in automotive competition for example, the emplacement of the connection for refueling with gasoline must be carried out as rapidly as possible and with all security so as to avoid spilling gasoline on the brakes of the vehicle which would cause the vehicle to catch fire.

Present connections must be positioned correctly which is to say that the male fitting, or fueling fitting, must be presented to the female fitting, generally carried on the vehicle in the gas tank of the latter, perfectly along the axis to permit sure emplacement. This is not always easy to carry out on the one hand because of the weight of the material used, in particular when gravity fuelling is used, and on the other hand because of the conditions of use which can be difficult, as the fueling of a racing vehicle, mid-air fueling of an aircraft, etc.

SUMMARY OF THE INVENTION

The present invention has for its object to overcome this drawback by providing a new type of female fitting and a pipe connection of the type comprising a male fitting engaged in said female fitting, the engagement ensuring the opening of a valve provided on at least one of these fittings being permitted even if the constituent elements of one and the other are not perfectly aligned.

To this end, the invention has as its object a female fitting for a pipe connection adapted to be carried on a receiving structure such as a pipe or a reservoir, of the type comprising a cylindrical body within which is disposed concentrically a sleeve defining the fluid channel and carrying at its external end, articulated in rotation, a spherical closure element having a diametral bore, a cylindrical ring surrounding said sleeve and the spherical closure element being disposed drivably in translation in the cylindrical body against the force of resilient return means, the translatory paths of the ring in the body giving rise to driving in rotation of the spherical closure element between its opening position in which its bore coincides with the fluid channel and its closed position, characterized in that the sleeve and the cylindrical ring of this female fitting are mounted oscillably in the body of said fitting.

Thus, preferably, when the engagement of a male fitting is carried out with this female fitting, the freedom of oscillation of the sleeve and of the cylindrical ring in the body of the female fitting permit the assembly of the elements to assume the same axis to guarantee correct and sure connection, even if this engagement has a defect of alignment.

The internal end of the sleeve of the female fitting, which is to say the end of the sleeve turned toward the pipe or more precisely toward the gas tank in the case of an onboard fitting, has spherical bearing surface that bears against a complementary bearing surface of the internal end of the cylindrical body of the fitting in the manner of a swivel joint whilst the outer end of the cylindrical ring has a peripheral spherical bearing surface that bears against a bearing surface of complementary shape on the external end of the cylindrical body.

In this way, the spherical bearing surfaces of the sleeve and of the external end of the ring permit, by sliding against the complementary bearing surfaces of the cylindrical body, an oscillation of said sleeve and of the ring relative to the principal axis of the female fitting, to permit alignment of these members with those of a male fitting which does not lie on the same axis.

So as to promote sliding of the sleeve relative to the cylindrical body during oscillation, the internal end of the body and the internal end of the sleeve are treated to improve the sliding between said ends, with a treatment such as that known commercial as "Microflon".

Preferably, at least one of the bearing surfaces of the internal end of the cylindrical body or of the internal end of the sleeve, comprises at least one ball bearing surface. The sliding of said bearing surfaces is thus improved.

As a modification, the bearing surface of the internal end of the cylindrical body comprises wells spaced regularly angularly about said spherical bearing surface and containing each a ball, a well having a central curved surface and a peripheral conical surface. There is thus ensured an automatic re-centering during oscillation.

The cylindrical ring of each fitting defines at its external end, on the side of the connection region, a sealing and bearing seat for the spherical closure element, also called a joint capture cross-piece which serves for the creation of a trapezoidal throat to receive a joint. This sealing and bearing seat provides in the female fitting the peripheral spherical bearing surface.

The resilient return means permitting sliding in translation of the cylindrical ring within the cylindrical body of the female fitting is preferably a spring mounted between the cylindrical ring and the sleeve. Preferably, this resilient return means is disposed between the external end of the cylindrical ring which it maintains in sealed bearing relationship with the cylindrical body and the internal end of the sleeve which it maintains in bearing relation on the cylindrical body. The ring and the sleeve are thus connected and can oscillate together within the cylindrical body.

The sleeve of the female fitting is preferably short, which permits a saving in size and weight of the female fitting. This is particularly advantageous when the female fitting is onboard a race car for example.

According to a preferred embodiment of the invention, the spherical closure element of the fitting is made to horseshoe shape and comprises moreover two diametrically opposed flats provided respectively on an axis and on a cylindrical casing having sectors made in fork shape is disposed concentrically to the interior of the cylindrical ring, the axles of the spherical closure element being disposed in said forks, the fingers of the forks entering into recesses provided in the thickness of the seat for sealing and bearing under the influence of a resilient return means such as a Belleville washer or the like disposed between said cylindrical casing and the internal end of the cylindrical ring.

In this embodiment, the center of the spherical element is strictly invariable no matter what axis is considered, its centering within the fluid stream separates it from any risk of parasitic friction. Thus the strength of the assembly during oscillation is promoted.

So as further to promote the engagement of a male fitting and a female fitting which can be rendered difficult because of the weight and the rigidity of the tubing to which the male fitting is connected, there can be emplaced between the receiving structure of the female fitting and the cylindrical body of said female fitting, a bellows which permits mating with the extreme angular positions.

The present invention also has for its object a pipe connection of the type comprising a female fitting according to the invention and a male fitting comprising a cylindrical body within which is disposed concentrically a sleeve defining the fluid channel and carrying at its outer end, articulated in rotation, a spherical closure element having a diametrical bore, a cylindrical ring, surrounding said sleeve and the spherical closure element, being disposed drivably in translation in the cylindrical body against the force of a resilient return means, the translatory paths of the ring within the body giving rise, during engagement of the male fitting on the female fitting, to the driving in rotation of the spherical closure element between its open position in which its bore is brought into coincidence with the fluid channel, and its closed position, characterized in that the sleeve of the male fitting provided at its external end with the spherical closure element and surrounded by the cylindrical ring, is mounted projecting from the cylindrical body and the male fitting moreover comprises a casing engaged between the cylindrical ring and the cylindrical body, sliding in translation in said cylindrical body, a resilient return means being interposed between the cylindrical body and the front surface of said casing which ensures the engagement against the female fitting.

Thus, the ring and the casing constitute a portion in the form of a piston for engagement on the female fitting.

Preferably, the spherical closure member of the male fitting is made as a horseshoe and comprises moreover two diametrically opposed flats provided respectively with an axle.

In the male fitting, the sleeve has at its end a cylindrical casing having sectors made in horseshoe shape in which are disposed the axles of said spherical closure element so as strictly to control the centering of said spherical closure element, a resilient return means being interposed between the cylindrical casing and the sleeve.

During engagement of the male fitting on the female fitting, sealing is ensured by the emplacement of the casing on the facade of the female fitting. Preferably, the front engagement surface of the casing is made in the form of a trumpet-shaped cone which promotes a blind engagement for bringing together the fronts of the male and female fittings constituting the interface between the fittings.

According to a preferred embodiment, the connection according to the invention comprises a second circulation circuit substantially concentric with the fluid channel, for example for collecting gas.

Thus, the cylindrical ring of the male fitting has at least two peripheral lobes which define passages between said ring and the casing, said passages communicating with an evacuation conduit opening into the cylindrical body of the male fitting whilst the cylindrical body of the female fitting comprises openings which, during connection between the male fitting and the female fitting, are placed in communication with the passages of the male fitting.

During emplacement of the connection according to the invention, a circuit separate from the fluid channel is thus established between a gas tank or conduit in which is mounted the female fitting and an evacuation conduit opening into the male fitting and in which is established a circulation through openings of the cylindrical body of the female fitting and passages defined by the lobes of the cylindrical ring of the male fitting, toward the pipe.

Thus, a connection according to this embodiment of the invention forms, during engagement of the male fitting on the female fitting, a closed passage which can serve for collecting gas and can be preferably used in the case of fueling with evaporable fluids such as compressed gas of which liquefied natural gas (cryogenic), combustibles and generally speaking all liquids which, stored, have both a liquid phase and a vapor phase.

When the interface has been established by engagement of the front engagement surface of the casing of the male fitting on the front surface of the female fitting, the bearing seat and the seal of the male fitting come to bear against the bearing seat and seal of the female fitting and press the latter back into the cylindrical body of the female fitting. The seal within the female fitting is broken and a passage is opened for the gas from the gas tank or pipe through openings of the female fitting. The release of gas from the gas tank thus commences, the gas is then passing into the passages defined by the lobes of the cylindrical ring of the male fitting, toward the conduit opening into the male fitting, such that there can thus be a collection of the gases.

The return of the cylindrical ring of the female fitting also permits progressive opening of its spherical closure member. Once the gas tank is fully open, the ring bears against the rear end of the female fitting, and abuts under the influence of the pressure of the operator, arising during return of the cylindrical ring of the male fitting in the cylindrical body of said male fitting which gives rise to the opening of the spherical closure element of the male fitting.

To avoid small quantities of combustible interfering with the gas flow, torque joints (static sealing) are disposed on the one hand on the conical shoulder of the interface and on the other hand in the rear base of the onboard connection.

Preferably, the casing of the male fitting has openings permitting visualizing, preferably over 360°, of the filling by the operator, by noting the rise of bubbles preceding the filling of the gas tank, and the possible resulting overflow from overfilling.

This device, constructed such that the casings and rings have staged diameters, permits the production of a mechanical assembly in which the risks of wedging are avoided.

Preferably, the translatory paths of the ring and the casing of the male fitting, of the ring of the female fitting relative to their respective cylindrical bodies and the force of the resilient return means determine the kinematics of opening and closing the spherical closure elements as well as that of the second circuit for gathering gas for example.

Thus, as to the transfer of evaporable fluids, whether it is a matter of respecting the environment, or of the safety of people and materials, or whether it is a matter of quick operation or avoiding for military apparatus (armored, helicopters) the radar signature of refueling at night or in fog, the connection according to the invention permits collecting the gas without requiring an implantation of a loop having to be provided for the connection, as was previously the case.

For these applications, the connection according to the invention permits any maneuver of transfer involving collection of gases, this degassing taking place even when filling has not begun and ending only after filling has been completed.

In the case of automotive competition, the connection according to the invention permits gravity refuelling whilst ensuring filling carried out in record time and suitable degassing, whilst protecting the operators, the vehicles as well as the pilots, which permits better controlling the numerous requirements for successive refueling during endurance races of the 24-hour type at Mans, for example.

The connection according to the invention thus has a direct passage velocity, a drastic reduction of weight and size of the onboard portion (female fitting), an operation according to the principle of gravity, the ability to be used under other circumstances under pressure by requiring only slight modifications, a rigorous automation (the connection follows an invariable sequence), maximum performance, and which ensures simultaneously the functions: of transferring combustible in laminar flow, according to $\phi 33$ m/m, (855 m/m$^2$) for example, degassing of the gas tank under static conditions by a quasi-rectilinear passage which offers a passage cross-section of about 1700 m/m$^2$, for example, the recovery of the gas is in static condition requiring a cross-section 1.5 times that of the supply.

Responding to the dead man principle and to the concept of gravity, the connection according to the invention satisfies all the requirements, whether in terms of effectiveness, reliability, safety or ergonomics.

According to a pre-established automatic and invariable sequence, the connection according to the invention guarantees centering and blind engagement, by peripheral guiding of the trumpet cone provided on the male fitting, a seating (and unseating) without risk of wedging, mechanical alignment of the components because of the oscillation of the sleeve and of the cylindrical ring within the female fitting, the automatic opening of the degassing openings then, consecutively, the opening of the closure of the gas tank, finally, the opening of the closure of the refueling male fitting, and conversely, the refilling having been accomplished and according to said sequence, the readability about 360°, of a possible reflux resulting from an overfill, and by disengagement, the closing of the closure of the refilling fitting (supply), the residual flow of the interface into the reservoir (automobile), the closing of the closure of the female fitting of the gas tank and then the end of degassing, finally the separation of the two fittings, even as a result of an abrupt startup.

It is to be noted that after overfilling, the connection according to the invention permits manual purge of the degassing circuit.

BRIEF DESCRIPTION OF THE DRAWINGS

There will now be described in greater detail a connection according to an embodiment of the invention with reference to the drawings, in which:

FIGS. 1a and 1b show respectively a view in longitudinal cross-section of a female fitting of a connection according to the invention, in the closed and in the open position.

FIGS. 3a and 3b represent respectively a view in longitudinal cross-section of a male fitting of a connection according to the invention, in the closed and in the open position;

FIG. 4 is a longitudinal cross-sectional view of the connection according to the invention, in the front connection position of the two fittings;

FIG. 5 is a view like FIG. 4 in the partially open position of the connection;

FIGS. 6a and 6b show respectively a view in side perspective and a view in longitudinal cross-section of the sleeve and of the spherical closure element of the male fitting.

DETAILED DESCRIPTION OF THE PREFERRED EMBODIMENT

Figure 2:
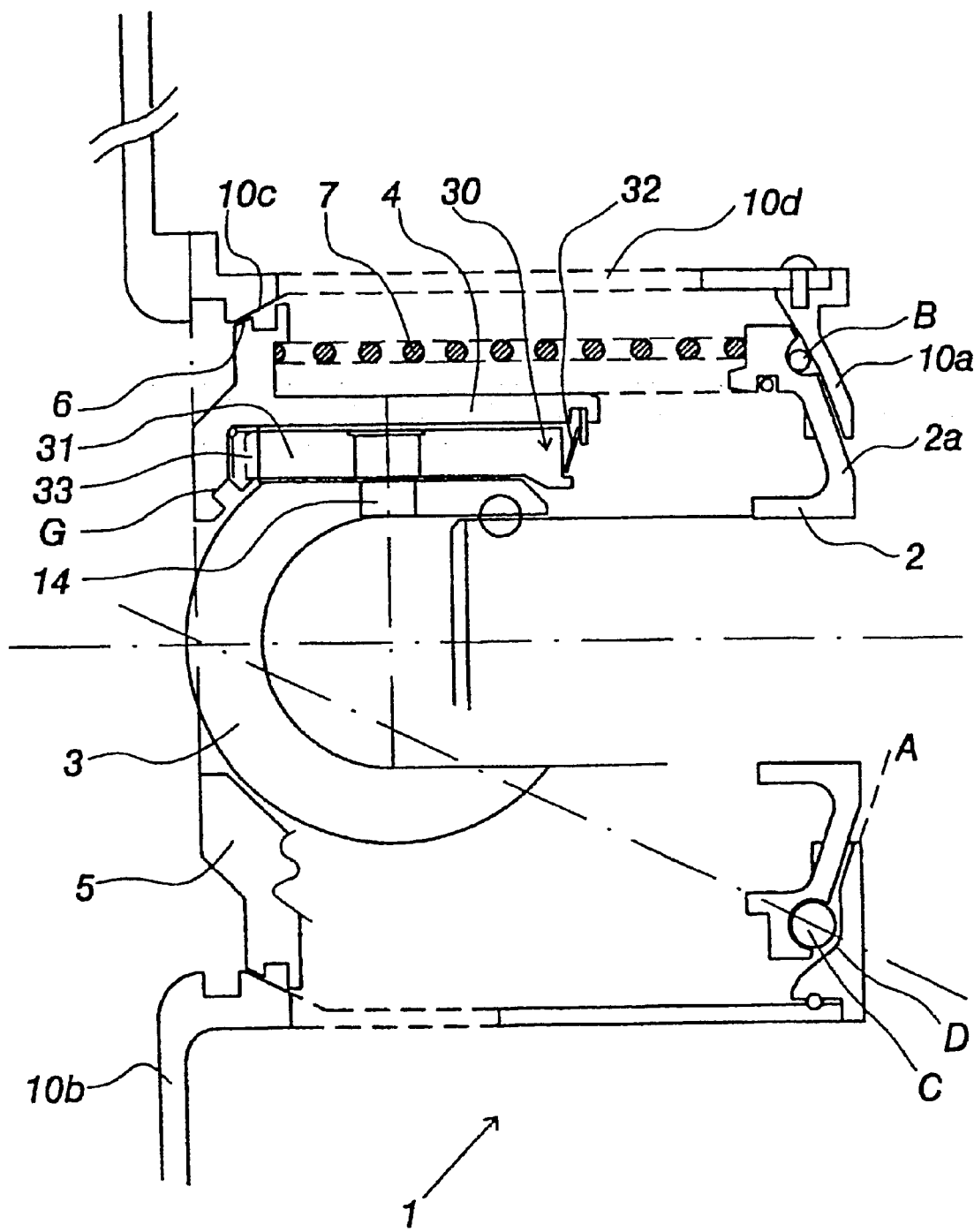
FIG. 2 is a longitudinal cross-sectional view of a female fitting according to FIG. 1a after rotation by 90°.

A pipe connection according to the invention comprises a female fitting 1 and a male fitting 8.

The female fitting 1 comprises a cylindrical body 10 or mounting on the gas tank of a vehicle for example.

In this cylindrical body 10 is mounted a sleeve 2 defining the fluid channel C at the external end of which is mounted a spherical closure element 3, a ring 4 being engaged slidably in the cylindrical body 10 and surrounding the sleeve 2 and the closure element 3.

The inner end of the sleeve 2, on the side of the gas tank of a vehicle, opposite its external end in connection with the closure element 3, has a bearing surface 10a provided at the inner end of the cylindrical body 10 opposite to its connection face 10b.

The end of the ring 4a on the external side of the female fitting 1 defines a sealing and bearing seat 5 against which bears the spherical closure element 3 and is provided with a peripheral bearing surface 6 of spherical shape in sealed bearing against a complementary bearing surface 10c of the cylindrical body 10, a resilient return means such as a spring 7 being interposed between the bearing surface 2a of the sleeve 2 and the peripheral bearing surface 6 of the ring 4.

Under the influence of the resilient return means 7, the peripheral bearing surface 6 of the ring 4 is maintained in sealed bearing against the complementary peripheral bearing surface 10c of the cylindrical body 10, the closure element 3 being in the closed position.

Preferably, the spherical closure element 3 is held spaced from the bearing and sealing seat 5 by a joint, the seat 5 serving as a cross-member for holding the joint defining a trapezoidal throat G for the joint. There is thus avoided the risk of abrasion and/or clogging of the sphere of the spherical closure element 3 when, for example, the latter is used for high vapor pressure fluids such as combustibles which have a low wetting power. There is thus avoided the risk of incomplete closure or of blockage.

Preferably, the joint is clad with a soft material such as that known by the commercial name "Teflon". This joint can be an O ring of large cross-section and high "Shore" hardness, of the FEP type, or a U shape joint of Teflon held in shape by a spring of the "Variseal" type, or else a large cross-section O ring capped with a journal bearing of the "double delta or plus seal" type.

As can be seen in FIG. 2 in the upper portion of the figure, at least one of the bearing surfaces 10a of the inner end of the cylindrical body 10 or 2a of the inner end of the sleeve 2, comprises at least one ball bearing surface B. There is thus promoted the sliding of said bearing surfaces 10a and 2a against each other.

As a modification, as is shown in the lower portion of FIG. 2, the bearing surface 10a of the inner end of the cylindrical body 10 comprises wells D distributed angularly regularly over said bearing surface 10a of spherical shape and each comprising a ball C, a well D having a central spherical surface and a peripheral conical surface. Thus, for example, there are emplaced five balls C of large diameter in five wells D spaced apart by 72°, these balls C being called upon to move over a cylindrical surface of the well D in the central region and conical peripheral region. The cone has a ramp angle, for example 10° of slope, relative to the tangent plane A. There is thus assured an automatic recentering during oscillation.

When it is desired to open the female fitting 1, there is exerted pressure on the bearing and sealing seat 5 against the force of the resilient return means 7. This pressure presses the ring back into the cylindrical body 1 and the closure element 3 is then driven by the ring 4 in rotation at the end of the sleeve 2 until its open position (FIG. 1b), the articulation of the spherical closure element 3 on the sleeve 2 is the same for the male fitting 8 and will be explained later with reference to FIGS. 6a and 6b.

The spherical bearing surfaces 2a and 6 provided at the inner end of the sleeve 2 and at the outer end of the ring 4 bearing against each other on supplemental bearing surfaces 10a and 10c of the cylindrical body 10, permit an oscillation of the ring assembly 4, sleeve 2 and the closure element 3 in the cylindrical body 10 by sliding against each other such that, when a male fitting 8 is connected, this oscillation permits the emplacement of the connection even when the male fitting 8 is engaged on the female fitting 1 misaligned, because it permits an alignment of the components of the male fitting 8 and the female fitting 1, the sleeve 2 and the cylindrical ring 4 pivoting to reach alignment with the male fitting 8.

The spherical closure element 3 is made as a horseshoe and comprises moreover two diametrically opposed flats 13 and provided respectively with an axle 14. A cylindrical casing 30 having sectors made in the form of forks 31 in which are disposed the axles 14 of said spherical closure element 3, is disposed concentrically within the cylindrical ring 4. The fingers of the forks 31 fit into recesses 33 provided in the thickness of the sealing and bearing seat 5 under the force of a resilient return means such as a Belleville washer 32 or the like, emplaced between said cylindrical casing 30 and the inner end of the cylindrical ring 4.

The centering of said spherical closure element 3 is strictly controlled and there is ensured a perfect holding of the assembly of the sleeve 2, ring 4 and spherical closure element 3 during oscillation.

The mail fitting 8 comprises a cylindrical body 8 in which is fixedly mounted a sleeve 9 defining a fluid channel C' closed by a spherical closure member 3', similar to that of the female fitting 1, mounted at the outer end of the sleeve 9.

This sleeve 9 comprises at its outer end a radial flange 11 (see FIG. 6b) whose two side surfaces are tangent to the external surface of the sleeve 9, a chamber opening into the sector of spherical zone opposite the active sector, being provided in the spherical closure element 3', this chamber comprising surfaces in sliding contact with the side surfaces of the flange 11 of the sleeve 9 and the rotary drive axle 12 of the closure element 3' being carried by the flange 11 of the sleeve 9 and perpendicular to said surfaces. The sleeve 2 has a similar structure.

The spherical closure element 3' of the male fitting is also made as a horseshoe and comprises moreover two diametrically opposed flats 13 and provided respectively with an axle 14. The sleeve 9 has at its end a cylindrical casing having sectors made as forks 15 in which are disposed the axles 14 of said spherical closure element 3' so as strictly to control the centering of said spherical closure element 31, a resilient return means 40 being disposed between the sleeve 9 and the cylindrical casing.

The sphere of the spherical closure element 3' of the male fitting 8 has a recess 3'a to permit the rotation of the sphere of the closure element 3 of the female fitting 1.

A cylindrical ring 16 extends about the sleeve 9 and the closure element 3' and defines at its outer end the sealing and bearing seat 17 against which the spherical closure element 3' bears.

This ring 16 is slidably mounted for translation within the cylindrical body 80 against the effect of a resilient return means such as a spring 81 interposed between the base of the cylindrical body 80 at its inner end, on the side of the refueling pipe for example, and the inner end of said ring 16, the path of said ring 16 within the cylindrical body 80 permitting the opening and closing of the spherical closure element 3'.

This path is defined by at least one opening 18 provided radially in the ring 16 and in which is engaged a pin 19 fixed in the cylindrical body 80.

A cylindrical casing 20 is interposed between the ring 16 and the cylindrical body 80. This casing 20 has at its outer end a front portion for engagement on the facade 10b of the female fitting 1 provided in the form of a trumpet cone 21. The casing 20 projects relative to the sealing and bearing seat 17. This casing 20 has at least one radial opening 22 in which is also engaged the pin 19 of the cylindrical body 80, the opening 22 delimiting a sliding path of this casing 20 within the cylindrical body 80 against the resilient return force of a spring 23 emplaced between the outer end of the cylindrical body 80 and the outer end of the casing 20.

To promote concentricity of the male fitting, three pins are provided.

Preferably, the ring 16 comprises a lobed periphery defining between each lobe 24 a passage 25 between said ring 16 and a casing 20, the passage 25 being in communication at the rear of the cylindrical body 80 with a pipe 26 opening into said cylindrical body 80.

The casing 20 comprises openings 27 permitting the readability of filling by the opertor.

Preferably, the male fitting 8 comprises wide and strong handles 28 to permit its gripping and manipulation. Moreover, said handles 28 protect the facade of the male fitting 8, also called the refueling or coupling fitting, from deterioration or pollution in the case of being dropped.

When the male fitting 8 is engaged on the female fitting 1, a misalignment of the assembly is corrected by the oscillation of the sleeve 2 and the ring 4 in the female fitting 1, the spherical bearing surfaces 2a and 6 sliding against the complementary bearing surfaces 10a and 10c of the cylindrical body 10.

When the interface has been established, the bearing and sealing seat 17 of the male fitting 8 comes to bear against the bearing and sealing seat 5 of the female fitting 1 and the ring 16 pushes the ring 4 back within the cylindrical body 10 of the female fitting 1. The seal within the interior of the female fitting 1 is broken and a passage is opened for gas through openings 10d provided in the wall of the cylindrical body 10 of the female fitting 1. Degassing of the gas tank thus begins, the gases passing through said openings 10d and then into the passages 25 defined by the lobes 24 of the cylindrical ring 16 of the male fitting 8, toward the conduit 26 opening into the male fitting 8, such that there can there be a collection of the gases (arrows in FIG. 5).

The return of the cylindrical ring 4 of the female fitting 1 also permits progressively opening its spherical closure element 3 (FIG. 5). Once the gas tank is fully open, the casing 20 of the male fitting 8 has completed its translatory movement whilst the cylindrical ring 16 of the male fitting 8 undergoes its return into the cylindrical body 80, under the pressure of the operator, and will give rise to opening of the spherical closure element 3' of the male fitting 8.

The translatory paths of the ring 16 and of the casing 20 of the male fitting 8, of the ring 4 of the female fitting 1 relative to their respective cylindrical bodies 80 and 10, and the force of the resilient return means 7, 23 and 81 determine the kinematics of opening and closing of the spherical closure elements 3 and 3', as well as of the second circuit for collecting gases for example.

What is claimed is:

1. Female fitting (1) for a pipe connection adapted to be carried by a receiving structure such as a pipe or gas tank, of the type comprising a cylindrical body (10) within which is disposed concentrically a sleeve (2) defining the fluid channel (C) and carrying at its external end, articulated in rotation, a spherical closure element (3) having a diametral bore (3a), a cylindrical ring (4), surrounding said sleeve (2) and the spherical closure element (3), being disposed drivably in translation in the cylindrical body (10) against the force of a resilient return means (7), the translatory movements of the ring (4) in the body (10, 80) driving in rotation the spherical closure element (3) between its open position in which its bore (3a) is brought into coincidence with the fluid channel (C) and its closed position, characterized in that the inner end of the sleeve (2) has a spherical bearing surface (2a) bearing against a complementary bearing surface (10a) of the inner end of the cylindrical body (10) of the female fitting as a swivel joint.

2. Female fitting (1) according to claim 1, characterized in that the inner end of the body (10) and the inner end of the sleeve (2) are treated to improve the sliding between said ends, with a treatment such as that an application of a fluorine-based thin layer.

3. Female fitting (1) according to claim 1, characterized in that at least one of the bearing surfaces (10a, 2a) of the inner end of the cylindrical body (10) or of the inner end of the sleeve (2) of the female fitting (1) comprises at least a ball bearing (B).

4. Female fitting (1) according to claim 1, characterized in that the bearing surface (10a) of the inner end of the cylindrical body (10) of the female fitting (1) comprises wells (P) distributed angularly regularly about said spherical bearing surface (10a) and each comprising a ball (C), a well (P) having a central concave surface and a peripheral conical surface.

5. Female fitting (1) according to claim 1, characterized in that the outer end of the cylindrical ring (4) defines a sealing and bearing seat (5) for the spherical closure element (3) and has a peripheral spherical bearing surface (6) bearing against a bearing surface (10c) of complementary shape on the outer end of the cylindrical body (10).

6. Female fitting (1) according to claim 1, characterized in that the cylindrical body (10) of the female fitting (1) comprises openings (10d).

7. Female fitting (1) according to claim 1, characterized in that the resilient return means is a spring (7) mounted between the ring (4) and the sleeve (2).

8. Female fitting (1) according to claim 1, characterized in that the spherical closure element (3) is made as a horseshoe and comprises moreover two diametrically opposed flats (13) provided respectively with an axle (14), a cylindrical casing (30) having sectors made as forks (31) being disposed concentrically in the cylindrical ring (4), the axles (14) of the spherical closure element (3) being disposed in said forks (31), fingers of the forks (31) being received in recesses (33) provided in the thickness of the sealing and bearing seat (5) under the force of a resilient return means such as a Belleville washer (32) or the like emplaced between said cylindrical casing (30) and the inner end of the cylindrical ring (4).

9. Female fitting according to claim 1, characterized in that a bellow is emplaced between the receiving structure of the female fitting (1) and the cylindrical body (10) of said female fitting (1).

10. Pipe connection of the type comprising a female fitting (1) according to claim 1 and a male fitting comprising a cylindrical body (80) within which is concentrically disposed a sleeve (9) defining the fluid channel (C') and having at its outer end, articulated in rotation, a spherical closure element (3') having a diametral bore (3a'), a cylindrical ring (16) surrounding said sleeve (9) and the spherical closure element (3') being disposed drivably in translation in the cylindrical body (80) against the force of a resilient return means (81), the translatory movements of the ring (16) in the body (80) giving rise, during engagement of the male fitting (8) against the female fitting (1), to the driving in rotation of said spherical closure element (3') between its open position in which its bore (3a') coincides with the fluid channel (C') and its closed position, characterized in that the sleeve (9) of the male fitting (8) provided at its outer end with the spherical closure element (3') and surrounded by the cylindrical ring (16) is mounted projecting from the cylindrical body (80) of the male fitting (8) and moreover comprises a casing (20) engaged, between the cylindrical ring (16) and the cylindrical body (80), slidably in translation in said cylindrical body (80), a resilient return means (23) being interposed between the cylindrical body (80) and the rear part of the front surface of said casing (20) which ensures engagement against the female fitting (1).

11. Connection according to claim 10, characterized in that the front engagement surface of the casing (20) is in the form of a trumpet cone.

12. Connection according to claim 10, characterized in that the outer end of the cylindrical ring (16) defines a sealing and bearing seat (17) for the spherical closure element (3') of the male fitting (8).

13. Connection according to claim 10, characterized in that it comprises a second circulation circuit substantially concentric with the fluid channel (C, C').

14. Connection according to claim 13, characterized in that the cylindrical ring (16) of the male fitting (8) has at least two peripheral lobes defining passages (25) between said ring (16) and the casing (20) and communicating with an evacuation conduit (26) opening into the cylindrical body (80) of the male fitting (8), passages (25) which, during connection between the male fitting (8) and the female fitting (1), are placed in communication with the openings (10d) of the female fitting (1).

15. Connection according to claim 13, characterized in that the closure element (3') of the male fitting (8) is made as a horseshoe and comprises moreover two diametrically opposed flats (13) provided respectively with an axle (14), the sleeve (9) of the male fitting (8) having at its end a cylindrical casing having sectors made in the form of forks (15) in which are disposed the axles (14) of said spherical closure element (3') so as strictly to control the centering of said spherical closure element (3'), a resilient return means (40) being disposed between the sleeve (9) and the cylindrical casing.

* * * * *